United States Patent [19]
Moskowitz et al.

[11] 3,977,739
[45] Aug. 31, 1976

[54] MAGNETIC BALL BEARING ASSEMBLY USING FERROLUBRICANTS

[75] Inventors: Ronald Moskowitz, Merrimack, N.H.; Wesley C. Howe, Waltham, Mass.

[73] Assignee: Ferrofluidics Corporation, Burlington, Mass.

[22] Filed: Sept. 6, 1974

[21] Appl. No.: 503,877

[52] U.S. Cl. .............................. 308/187; 184/1 R; 184/1 E; 277/80; 308/10; 308/188; 308/202
[51] Int. Cl.² ................... F16C 19/06; F16C 33/32; F16C 33/34; F16C 33/58
[58] Field of Search .................. 184/1 R, 1 D, 1 E; 252/35; 308/78, 168, 187, 10, 187.1, 201, 202, 207 R, 215, 216, 217, 9, 188; 192/21.5; 277/80

[56] References Cited
UNITED STATES PATENTS

| | | |
|---|---|---|
| 1,758,446 | 5/1930 | Koethen .......................... 252/35 |
| 2,591,129 | 4/1952 | Brouwer .......................... 184/1 R |
| 3,011,842 | 12/1961 | Norris .......................... 308/188 |
| 3,031,802 | 5/1962 | Leliaert .......................... 277/80 X |
| 3,104,917 | 9/1963 | Schwartzwalder .................. 308/9 |
| 3,746,407 | 7/1973 | Stiles et al. .................. 308/9 X |

Primary Examiner—Robert J. Spar
Assistant Examiner—Howard Beltran
Attorney, Agent, or Firm—Morris Liss

[57] ABSTRACT

A roller assembly utilizes a ferrofluid as a lubricant (ferrolubricant). Integral structural portions of the assembly are made to have magnetic portions which create their own magnetic field gradient causing magnetic field maxima at points immediately surrounding the contact point between a particular roller element and its raceway. This in turn entrains the ferrolubricant around the contact point thus ensuring continued lubrication of contacting surfaces. Further, the entraining action prevents leakage of the ferrolubricant from the assembly.

3 Claims, 2 Drawing Figures

MAGNETIC BALL BEARING ASSEMBLY USING FERROLUBRICANTS

FIELD OF THE INVENTION

The present invention relates to the lubrication of rotating and sliding couplings, which are permanent magnets per se, such as ball bearings, roller bearings, ball-screw acutators, sliding mechanisms, and the like. More particularly, the present invention is directed to such an assembly utilizing a magnetizable oil (ferrolubricant) that is maintained at contacting surfaces by a magnetic field generated by integral magnetic structures within the assembly.

BRIEF DESCRIPTION OF THE PRIOR ART

Ferrolubricants, i.e., magnetizable lubricants that can be controlled and held in place by magnetic means, were developed because users of rotating and sliding mechanisms have always experienced problems in retaining lubricants at the critical wear or contact points.

Liquids such as oils, are the ideal lubricants; however, they do not tend to stay at the critical areas. It is even difficult to maintain them within the confines of the mechanism due to creep, gravity, centrifugation or other forces generally leading to oil migration. When the oil migrates, the quantity left in the assembly or mechanism is reduced thereby potentially reducing the life of the assembly. Another problem created in contamination of adjacent areas where oil is not desired, such as electrical connections, lenses, armatures, slip rings, etc.

Designers and engineers have attempted to overcome migration problems by using higher viscosity materials, commonly greases. Greases eliminate the contamination of adjacent areas due to migration but create new problems due to their high viscosity. When used in rotating or sliding mechanisms, more torque is required to start and move the mechanism. The torque requirement does not remain constant in that grease when left static tends to take a set resulting in high starting torque.

Temperature increases result when mechanical movement commences. This thermal increase in many cases will be high enough to deteriorate the lubricating properties of the grease, also the thermal increase changes the lubricant's viscosity resulting in changing torque requirements which are very undesirable in precision mechanisms.

Ferrolubricants, commonly oils that have been made controllable by magnetism, were developed in an attempt to overcome the aforementioned adverse conditions. External magnetic sources have been required to hold the ferrolubricant in place at the critical wear or contact areas leading to increased dimensions. Manufacturers, in general, resist retooling costs inherent in making dimensional modifications in their existing equipment. Accordingly, the widespread potential use of ferrolubricants has been slowed.

BRIEF DESCRIPTION OF THE PRESENT INVENTION

The present invention will alleviate these problems and will allow users and manufacturers of rotating and sliding mechanisms to take advantage of the desirable characteristics of oil lubrication, without the disadvantages of oil migration, lack of lubrication in critical areas, and changing torque required to move the system. The invention can easily be incorporated in such items as ball bearings, roller bearings, needle bearings, linear ball bushings, ball screws, thrust bearings, cam followers, recirculating roller bearings, all of which have rolling or sliding elements.

These rolling or sliding elements are conventionally manufactured of materials that are magnetically soft such as carbon steels which do not retain a permanent magnetic charge of any magnitude for an extended period of time.

If a number of conventional rolling or sliding elements were replaced with a hard magnetic material such as any of the aluminum–nickel–cobalt (ALNICO) alloys, rare earth alloys, mischmetal alloys, ferrites, ceramics or rubber or plastic matrices of ferrites or in general any permanent magnet material; then these special rolling elements will directly and positively hold a reservoir of ferrolubricant in the assembly and also accomplish the following:

A. The new rolling elements will make the conventional rolling elements slightly magnetic as a result of their magnetic permeability converting them into satellite magnetic sources.

B. The point or line contacts between the rolling elements and the stationary elements will concentrate magnetic field at these contact points or lines.

C. The ferrolubricant will be entrained or will congregate at the point of highest magnetic field which is the most critical area of wear.

D. The new magnetic rolling or sliding elements will constantly retrieve any excess ferrolubricant in the system, thereby eliminating any undesirable migration.

E. The magnetic source is contained within the rotating mechanism thereby eliminating any need for dimensional change in existing equipment.

F. The magnetic sources are contained in the rolling or sliding mechanisms as integral or functional components.

G. The new assemblies are thus directly interchangeable with previous units.

H. No additional external permanent magnets, current sources or hardware are required.

Construction of the invention can take place in rolling or sliding elements, and more generally where lubrication between relatively moving elements exists. However, for purposes of simplifying the explanation of the invention, the construction of the invention will be explained only in terms of rolling elements, such as ball bearings.

Construction of the rolling element can be done in many ways. Conventional permanent magnet materials are brittle and subject to chipping or cracking. On the other hand, they may be in a matrix of rubber or plastic and prone to fast or accelerated wear, or subject to attack by solvents and/or oils. Brittle magnets (Group I) are typically the ALNICO series, rare earth magnets or ceramics. Soft materials (Group II) are the plastic or rubber based magnets. Choices of permanent materials will depend upon particular applications for the assemblies to which the present invention is applied. The invention encompasses all permanent magnet materials.

Design considerations of the two types are as follows:

Group I

1. Random shapes of these materials can be molded into a ball or roller of NYLON, TEFLON, or any preferred material.
2. Ball or roller shoes can be manufactured from these materials, then coated with either metal (chrome, nickel, cadmium, magnesium, or any hard metal) or plastic (TEFLON, NYLON).
3. Shapes can be made to size and used without coatings.
4. Shapes can be made to slight under-size to alleviate stress loadings.

Group II

It is most likely that the materials in this group will need coatings and should be made to the configuration needed and then coated with metal or plastic.

It will be noted that the above design considerations assume that the magnetizing portion of an assembly are the roller elements or sliding elements in the case of a sliding mechanism.

The invention also encompasses the magnetization or insertion of permanent magnet material into the supporting structure of a mechanism. For example, in a roller bearing, the races or separator may be magnetized or fabricated with permanent magnetic material to set up the necessary magnetic field for the assembly. This may be done in lieu of magnetic roller elements, or in combination with magnetic roller elements.

DETAILED DESCRIPTION OF THE INVENTION

As previously indicated, the utilization of an integrally formed magnet within a rotating or sliding mechanism is the breadth to which the present invention is directed. More particularly, the word integral is meant to indicate that an existing component of conventional coupling mechanisms may be magnetized or fitted with magnetic material, rather than inserting a separate and distinct magnetic member within a coupling, which would increase its size and alter the geometry of a conventional mechanism.

The present description will relate to a roller bearing. As previously discussed, the invention is applicable to all types of rolling and sliding mechanisms. Concentration on a roller bearing is made only to expedite the description of the invention.

Figure 1:
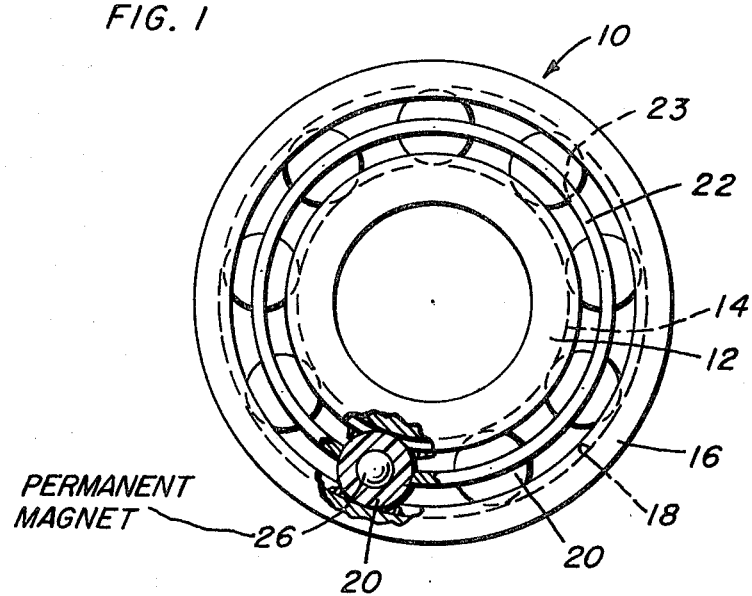
FIG. 1 is an end view of a roller bearing, illustrating the components of a conventional bearing used with the present invention.

Referring to the figures and more particularly FIG. 1, thereof, reference numeral 10 generally indicates a roller bearing of conventional design. The bearing mechanism or assembly includes an inner race 12 having a circular raceway 14 formed therein. A second concentric outer race 16 is positioned in radial spaced relation from the inner race 12. A raceway 18 similar to the raceway 14 is formed in the outer race 16. A number of roller elements 20 are positioned between the inner and outer races 12 and 16. More particularly, the contacting areas of the rolling elements 20 roll along conforming surfaces of the raceways 14 and 18. The roller bearing 10, which is conventional, includes cylindrical rollers. However, as will be appreciated, the structure illustrated resembles a ball bearing mechanism, to which the invention is equally applicable.

A separator or retainer 22 is radially positioned between the inner and outer races 12 and 16. The separator 22 has a number of openings 23 formed therein, to accomodate a respective rolling element. The operation of the depicted roller bearing 10 is well known and will not be dealt with herein.

Figure 2:
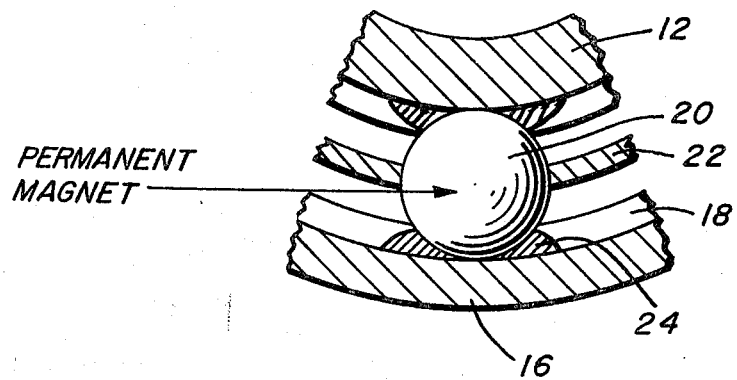
FIG. 2 is a partial sectional view of a magnet taken through the outer raceway, of FIG. 1 showing the location of a magnetic roller element in its respective raceway. The entraining of magnetic fluid about wear points is also shown.

Referring to FIG. 2, the positioning of a rolling (cylinder or ball) element 20, within the raceway 18 is illustrated. Also, the disposition of a lubricant 24, relative to the illustrated components, is shown. In conventional roller bearings, the lubricant 24 would be oil or grease. However, in the present invention, the lubricant is a ferrolubricant. This is the first aspect to the present invention.

A second aspect to the present invention is the incorporation of a magnetic field within the mechanism to entrain the ferrolubricant 24 in the wear area illustrated in FIG. 2. This prevents the leakage of lubricant in the wear area. In prior art, this has been accomplished by incorporating separate or distinct magnetic structures external to the mechanism. However, the present invention contemplates the magnetization of components shown in FIG. 2, or the inclusion of magnetic inserts within existing integral components as shown in FIG. 1. In FIG. 2, the roller element 20 is shown as a solid element which is permanently magnetized. This, as previously mentioned, will maintain the envelope geometry of a particular mechanism without increasing any dimension. A major advantage of the present invention is the fact that the invention may be incorporated in present production facilities without retooling.

Referring to FIG. 1, an optional method of creating the necessary magnetic circuit, rather than magnetizing a particular mechanism component, or components, is indicated by reference numeral 26. This reference numeral indicates a magnetic core or inlay, which is formed within a core that is centrally located in the rolling element. This results in a magnetic source which is encapsulated in hard metal that wears well.

Alternately, or in addition thereto, the components 12, 16, 20, or 22 may be magnetized, if they are made of magnetic material, in which event they will singularly or in combination serve as a magnetic source that sets up a magnetic field gradient through the assembly. Alternately, any of the mentioned components may be outfitted with the insert or inlay, as previously mentioned. The use of a single magnetized or magnetic component may be employed, or several may be employed, in combination.

The primary criteria for the invention include a number of factors.

1. A low viscosity magnetic fluid reservoir might be entrained about a rotating or sliding member, by virtue of a magnetic gradient force sufficient to achieve the entraining action.
2. The geometry of a mechanism, after being outfitted with the present invention, will maintain the same geometry as a comparable, prior mechanism. This is accomplished by the utilization of magnetized or magnetic sources, in the form of an existing integral component.

3. The flux density resulting from the magnetic gradient has a maxima proximate to a point of contact between a rolling/sliding member and an abutting supporting member, such as a raceway. As will be appreciated, a number of maxima points of flux density exist within a mechanism, each wear area evidencing such a maxima.

By way of example, a ferrolubricant of the type discussed may be the substance manufactured by FERROFLUIDICS CORPORATION and specified as a synthetic hydrocarbon PO-2. This is merely illustrative.

In the event a rubber magnet is to be used as an insert, it may be of the type known as PLASTIFORM, distributed by PERMAG CORPORATION, Jamaica, N.Y.

In order to assemble the present invention, the ferrolubricant need only be injected into the assembly by a hypodermic needle, or like injector. This is an established art technique.

As a result of the present invention, an improved mechanism whether rotatable or sliding is achieved wherein ferrolubricant is utilized to effect superior lubrication qualities to the mechanism.

Wherefore we claim the following:

1. In a coupling mechanism having first and second races and raceways located in the races, an improvement to the lubrication of the mechanism comprising:
   permanently magnetized rolling elements positioned in the raceways for rolling contact therewith, to permit rotation of the races relative to one another;
   the magnetized elements further producing a magnetic field within the mechanism, flux density being maximized at wear surfaces, defined at contact points between the elements and the raceways; and
   ferrolubricant material in the mechanism and entrained at the contact points by the magnetic influence of the maximized flux density.

2. The subject matter set forth in claim 1 wherein the permanently magnetized rolling elements comprise a plurality of elements being solid and made of hard metal for exhibiting long wearing characteristics.

3. The subject matter set forth in claim 1 wherein the permanently magnetized rolling elements comprise a plurality of elements having a permanent magnet core and an outer encapsulation of magnetically permeable hard metal, having long wearing characteristics.

* * * * *